US011925269B2

(12) United States Patent
Long

(10) Patent No.: US 11,925,269 B2
(45) Date of Patent: Mar. 12, 2024

(54) MATTRESS SYSTEM AND ASSEMBLY

(71) Applicant: KING KOIL LICENSING COMPANY, INC., Willowbrook, IL (US)

(72) Inventor: I. David Long, Willowbrook, IL (US)

(73) Assignee: KING KOIL LICENSING COMPANY, INC., Avondale, AZ (US)

( * ) Notice: Subject to any disclaimer, the term of this patent is extended or adjusted under 35 U.S.C. 154(b) by 19 days.

(21) Appl. No.: 17/187,506

(22) Filed: Feb. 26, 2021

(65) Prior Publication Data

US 2022/0273114 A1 Sep. 1, 2022

(51) Int. Cl.

| | |
|---|---|
| ***A47C 27/08*** | (2006.01) |
| ***A47C 27/10*** | (2006.01) |
| ***A47C 27/12*** | (2006.01) |
| ***A61G 7/057*** | (2006.01) |

(52) U.S. Cl.

CPC .......... *A47C 27/082* (2013.01); *A47C 27/081* (2013.01); *A47C 27/088* (2013.01); *A47C 27/10* (2013.01); *A47C 27/125* (2013.01); *A47C 27/128* (2013.01); *A61G 7/05715* (2013.01); *A61G 7/05769* (2013.01); *A61G 7/05776* (2013.01)

(58) Field of Classification Search

CPC ... A47C 27/081; A47C 27/082; A47C 27/083; A47C 27/088; A47C 27/10; A47C 27/127; A47C 27/18; A47C 27/128; A47C 27/087; A47C 27/125; A61G 7/05769; A61G 7/05776; A61G 7/05784; A61G 7/05707; A61G 7/05715; A61G 2200/32; A61G 7/05746; A61G 7/05753; A61G 7/05761; A61G 7/05792; F16M 13/005; F16M 13/02; A45C 13/30; A45C 2013/025; Y10T 24/318; Y10T 24/39

See application file for complete search history.

(56) References Cited

U.S. PATENT DOCUMENTS

| | | | | |
|---|---|---|---|---|
| 2002/0128572 A1* | 9/2002 | Chang | A61H 9/0078 601/148 |
| 2015/0059100 A1 | 3/2015 | Brubaker et al. | |
| 2015/0135444 A1* | 5/2015 | Spahn | A61G 7/05769 5/655.3 |

(Continued)

FOREIGN PATENT DOCUMENTS

| | | |
|---|---|---|
| CN | 206044084 U | 3/2017 |
| EP | 0579381 A2 * | 1/1994 |

(Continued)

OTHER PUBLICATIONS

Search Report & Written Opinion issued in Int'l Appl. No. PCT/US2022/017466 (2022).

*Primary Examiner* — David R Hare
*Assistant Examiner* — Deborah Talitha Gedeon
(74) *Attorney, Agent, or Firm* — Barnes & Thornburg LLP

(57) ABSTRACT

A mattress system with at least two inflatable bladders located within a tub compartment of a foam encasement is enclosed. The bladders are surrounded on all sides by foam layers and the bladders are inflated and deflated by a control unit. The control unit is positioned within the tub compartment near the foot of the mattress and centered between the two bladder assemblies. The control unit is adhered to the foam encasement.

9 Claims, 11 Drawing Sheets

(56) References Cited

U.S. PATENT DOCUMENTS

| | | | | |
|---|---|---|---|---|
| 2015/0175081 | A1* | 6/2015 | Rodriguez | A45C 7/0077 224/275 |
| 2016/0113409 | A1* | 4/2016 | Moran | A61G 7/05 5/503.1 |
| 2018/0289174 | A1* | 10/2018 | Ye | A47C 21/006 |
| 2019/0075931 | A1* | 3/2019 | Yu | A47C 27/082 |
| 2019/0274445 | A1 | 9/2019 | Yu et al. | |

FOREIGN PATENT DOCUMENTS

| | | | | | |
|---|---|---|---|---|---|
| GB | 2492336 | A | * | 1/2013 | A45F 3/04 |
| JP | 2015-128571 | | | 7/2015 | |
| KR | 10-2005-0064491 | | | 6/2005 | |
| KR | 20100006041 | U | * | 6/2010 | |
| KR | 101047162 | B1 | * | 7/2011 | |
| WO | WO-0187121 | A2 | * | 11/2001 | A47C 15/006 |

* cited by examiner

MATTRESS SYSTEM AND ASSEMBLY

TECHNICAL FIELD

The present disclosure generally relates to mattress construction, and more particularly, to a mattress system and assembly.

BACKGROUND

Current mattress technologies may include electrically coupling a mattress with a control unit for adjusting various attributes thereof. More particularly, the control unit may be coupled with components of the mattress, such as air bladders, heating elements, and reclining mechanisms. An individual may operate the control unit (e.g., using a remote control) to manipulate the components and adjust attributes such as mattress firmness, reclining settings, wake-up mechanisms, and so on. Advantageously, the individual may configure, via the control unit, an optimal user setting specific to his or her needs.

Placement of the control unit relative to the mattress is a known issue. Generally, the control unit is situated externally from the mattress. However, positioning the control unit externally results in several issues affecting user experience. For instance, the control unit can occupy a considerable amount of physical space, which can cause obstruction or be unsightly for the individual. As another example, the control unit may include a compressor that generates a relatively loud noise, which can disrupt the individual's sleep.

SUMMARY

Embodiments presented herein disclose a mattress system and assembly.

An embodiment of the mattress system generally includes at least two inflatable bladder assemblies located within a foam encasement. The bladder assemblies are surrounded on all sides by foam layers and the bladders are inflated and deflated by a control unit, which includes a compressor. The control unit is positioned within the foam encasement near the foot of the bed and centered between the two bladder assemblies. The control unit is attached to the foam encasement using a combination of double-sided adhesives at the base of the unit and straps threaded from under the encasement and over the control unit.

A set of cables (e.g., used to power the control unit and hand controls) is threaded from holes opened at the bottom of the foam encasement and connected to the control unit in a given arrangement. Once connected, an additional foam layer (formed of two foam inserts) is placed atop the foam encasement to cover the set of cables. The end user may access the cables for plugging into a power source. The ends of the cables may be wrapped with anti-static material to prevent electric damage to the control unit during transit. Further, each bladder assembly includes a set of hoses for attachment to the control unit and secured through the center of the encasement using an adhesive. A foam insert is placed between the bladder assemblies to further secure the placement of the components. At least one additional foam layer is placed atop the assembly to cover the encasement.

DETAILED DESCRIPTION

Figure 1:
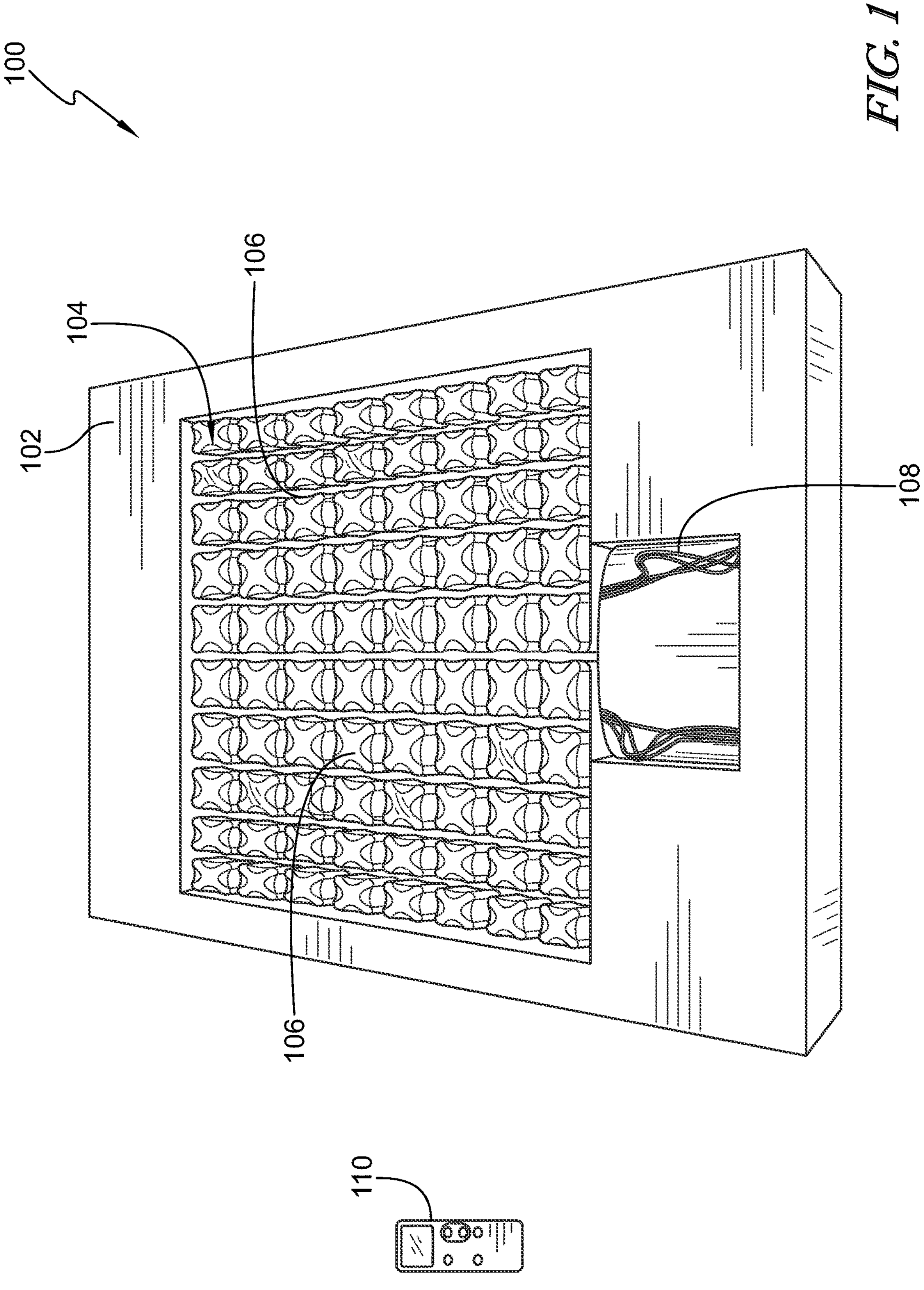
FIG. 1 illustrates a perspective view of an example tub compartment of a mattress system, according to an embodiment.

While the present disclosure may be susceptible to embodiment in different forms, there is shown in the drawings, and described herein in detail, embodiments with the understanding that the present description exemplifies principles of the disclosure and does not intend to exhaust or limit the disclosure to the details of construction and the arrangements of components set forth in the following description and illustrated in the drawings. The present disclosure is described in connection with one or more contemplated embodiments which are not intended to be limiting of the scope of the present disclosure. The present disclosure is intended to encompass those embodiments as well as equivalents and variations.

Embodiments presented herein disclose a mattress system layout and assembly. The mattress system has an encasement. The encasement includes a tub compartment that stores various components, including inflatable bladder assemblies used to provide varying degrees of firmness for the underlying mattress. A control unit may be electrically coupled with the mattress to allow for control features of the mattress system, such as air flow to and from the bladder assemblies. Further, embodiments disclose a section within the tub compartment for storing the control unit. Further still, techniques are disclosed for coupling the control unit within the tub compartment such that the control unit is operable from within the mattress system. Advantageously, positioning the control unit within the mattress allows for relatively easier installation of the mattress system for the individual user, noise resulting from the control unit can be dampened (e.g., by at least 4 to 6 dB), and the mattress system as a whole occupies less physical space compared to systems in which the control unit is externally located.

In addition, positioning the control unit within the mattress can also pose some unique challenges in the assembly and transport of the mattress, e.g., from a warehouse to a household location. For example, transport can increase the risk of components within the mattress system being moved in an improper position. For instance, the control unit, if not secured, can move around and affect connection quality of power cables and air hoses attached thereto. Further, power cables, if not secured during transport, can generate static electricity due to friction between the electrical plug and fabric from the mattress. The static electricity can damage the electrical plug and other components, such as the control unit itself. To address these concerns, embodiments disclosed herein provide techniques for securing components within the tub compartment to prevent the components from coming loose or moving around during assembly and transport of the mattress system. For instance, techniques provide a method for looping a set of straps from under the tub compartment to secure the control unit to the mattress assembly. Further, electrical plugs of power cables may be wrapped with an anti-static material during the assembly process to prevent static electricity from forming during assembly or transport of the mattress.

FIG. 1 illustrates a perspective view of components of a partially-assembled mattress system 100. More particularly, FIG. 1 depicts an upper surface of an encasement 102 and a remote control 110 of the mattress system 100. The encasement 102 serves as a layer of an underlying mattress, in which the encasement 102 is formed of a material such as foam (e.g., latex foam, polyurethane foam, viscoelastic foam, etc.). Illustratively, the encasement 102 includes a tub compartment 104. The tub compartment 104 is an inner portion of the encasement 102 that stores a variety of components of the mattress system 100, such as inflatable air bladders 106 towards the head of the mattress and a control unit 108 towards the foot of the mattress. Illustratively, each air bladder 106 may be formed of multiple inflatable cells. The control unit 108 is electrically coupled to the mattress system 100 via a power supply (not shown) and is configured to control various aspects of the mattress system 100. For example, the control unit 108 may control the flow of air to and from a portion or all cells of each inflatable air bladder 106, e.g., to adjust the firmness of the underlying mattress. To do so, the control unit 108 may couple with the inflatable air bladders 106 via one or more hoses connecting the air bladders 106 to air chambers in the control unit 108. An individual may adjust the firmness using the remote control 110, which may be wired or wirelessly coupled with the control unit 110. Further, the control unit 108 may allow the individual to adjust other features of the mattress system 100, such as temperature, recline, and alarm settings. In other embodiments, the control unit 108 may be wirelessly controlled by other means, such as via a software application executing on a mobile device. As stated, the control unit 100 is placed towards the foot of the tub component 104. Such placement advantageously dampens noise and vibration caused by operation of the control unit 100. The assembly of the mattress system 100 is further explained herein.

Figure 2B:
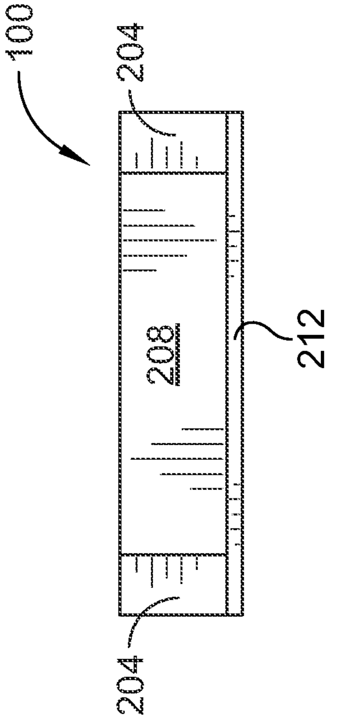
FIGS. 2A and 2B illustrate block diagrams of an example mattress system, according to an embodiment.
Figure 2A:
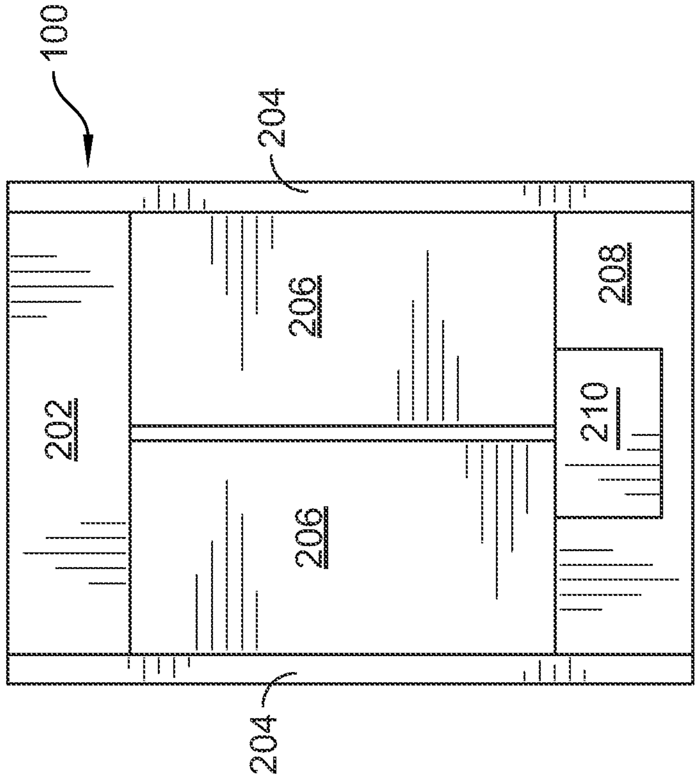

Referring now to FIGS. 2A and 2B, block diagrams of the encasement 102 are shown from an overhead perspective and from a front-facing perspective, respectively. More particularly, the block diagram depicts the placement of various foam layers and components in the encasement 102 as assembled. Illustratively, the encasement 102 includes foot rail 202, side rails 204, base inserts 206, foot rail 208, control unit topper 210, and base 212. Each of these components may correspond to a foam material, such as a latex foam, polyurethane foam, viscoelastic foam, and the like. Of course, other arrangements of the foam layer components may be contemplated.

Figure 3:
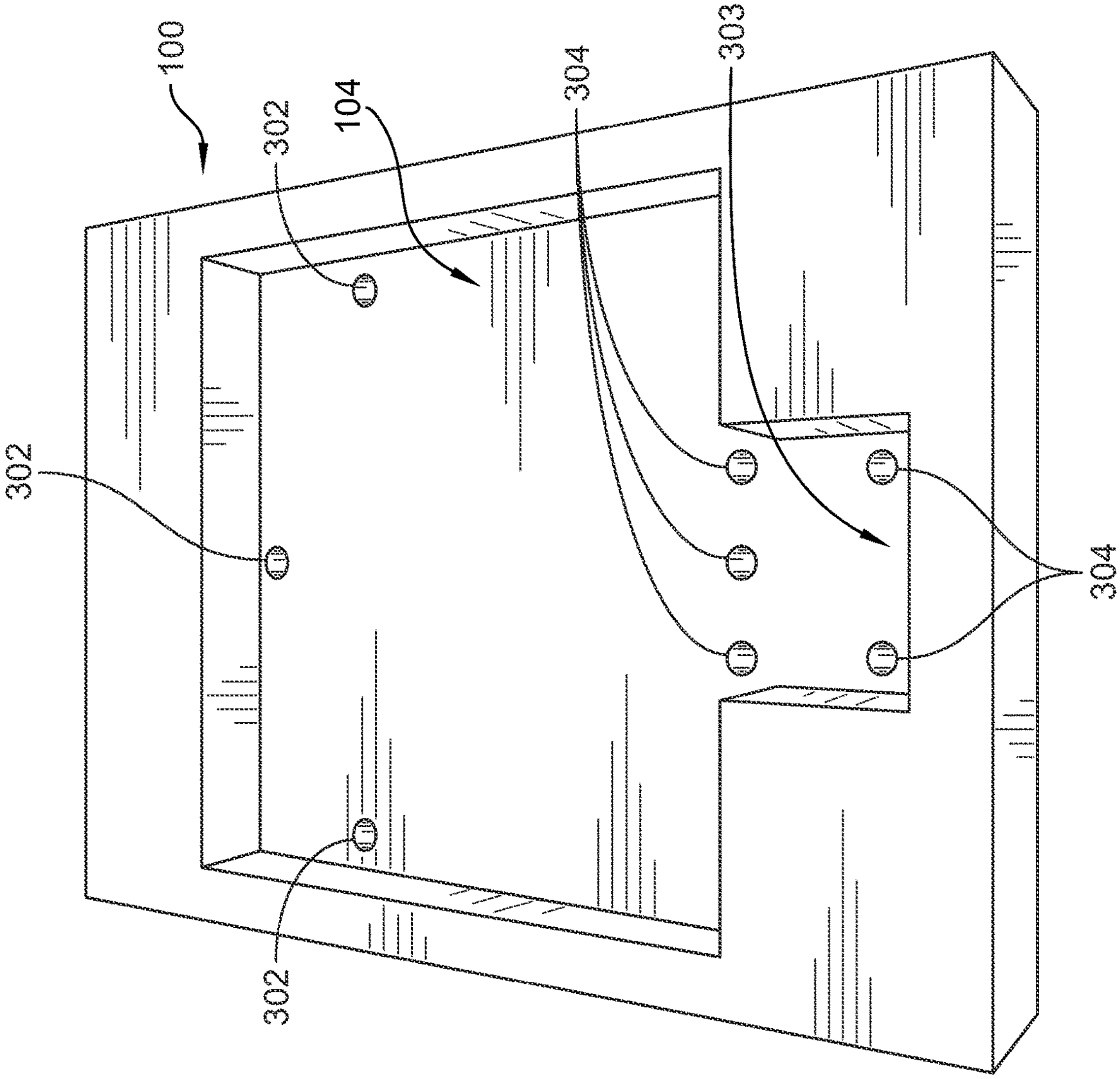
FIG. 3 illustrates a perspective view of an example tub compartment of the mattress system of FIG. 1 without components, according to an embodiment.

Referring now to FIG. 3, a perspective view of the encasement 102 is shown without the components of FIG. 1. In assembly of the mattress system 100, holes 302 may be formed in different locations of the tub compartment 104 for use in threading material therethrough. As shown, holes 302 may be formed from the bottom of the encasement 102 and out the upper surface of the tub compartment 104. In assembly, power cables may be threaded from the control unit 108 through each of the holes 302. During this process, each power cable may be wrapped with an anti-static material to prevent static electricity from being generated while threaded.

Further as shown, FIG. 3 provides a control unit section 303 of the tub compartment 104 in which the control unit 108 is to be placed. Illustratively, holes 304 are formed from the bottom of the encasement 102 and out the upper surface of the control unit section 303. While FIG. 3 depicts a particular arrangement of the holes 302 and holes 304, one of ordinary skill in the art will recognize that other configurations of the holes 302 and the holes 304 may be adapted for the mattress system 100. For example, the amount of holes 302 and holes 304 formed on the tub compartment 104 may vary, and the placement of the holes 302 and holes 304 may also vary.

Figure 4:
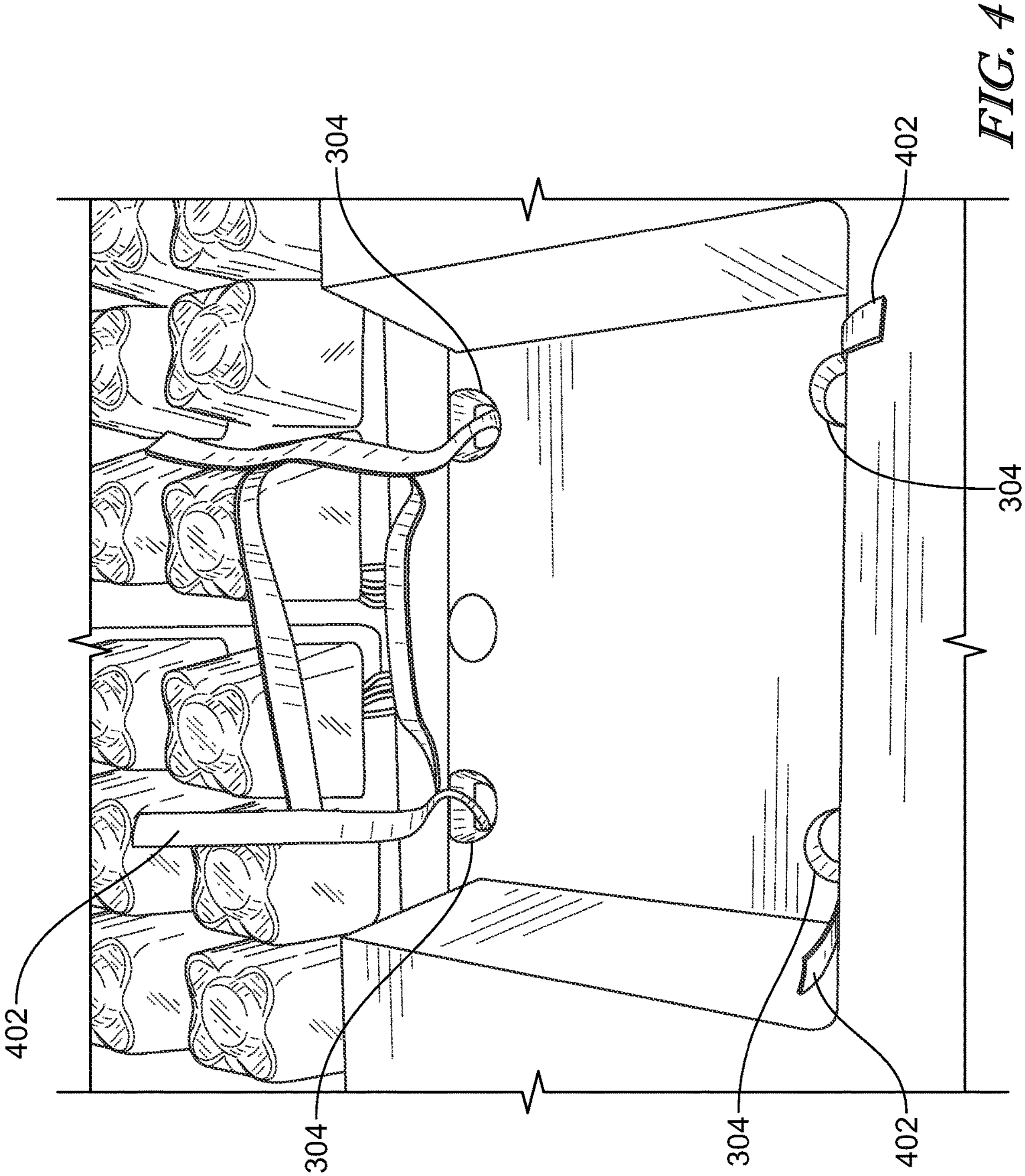
FIG. 4 illustrates an overhead view of an example control unit section of the tub compartment of the mattress system of FIG. 1, according to an embodiment.

Referring now to FIG. 4, in assembly, straps 402 are threaded through the holes 304 and engaged over the control unit 108 to secure the control unit 108 to the control unit section 303. Various types of straps may be used, such as Velcro straps, carabiner clip straps, rope, and so on. In addition, to further prevent the control unit 108 from being displaced during transport of the mattress system 100, an adhesive (e.g., a double-sided tape, glue) may be applied to the base of the control unit 108 and adhered to the surface of the control unit section 303. Of course, other methods can be used to adhere the base of the control unit to the surface, including Velcro adhesives, glue, mounting mechanisms, etc.

Figure 5:
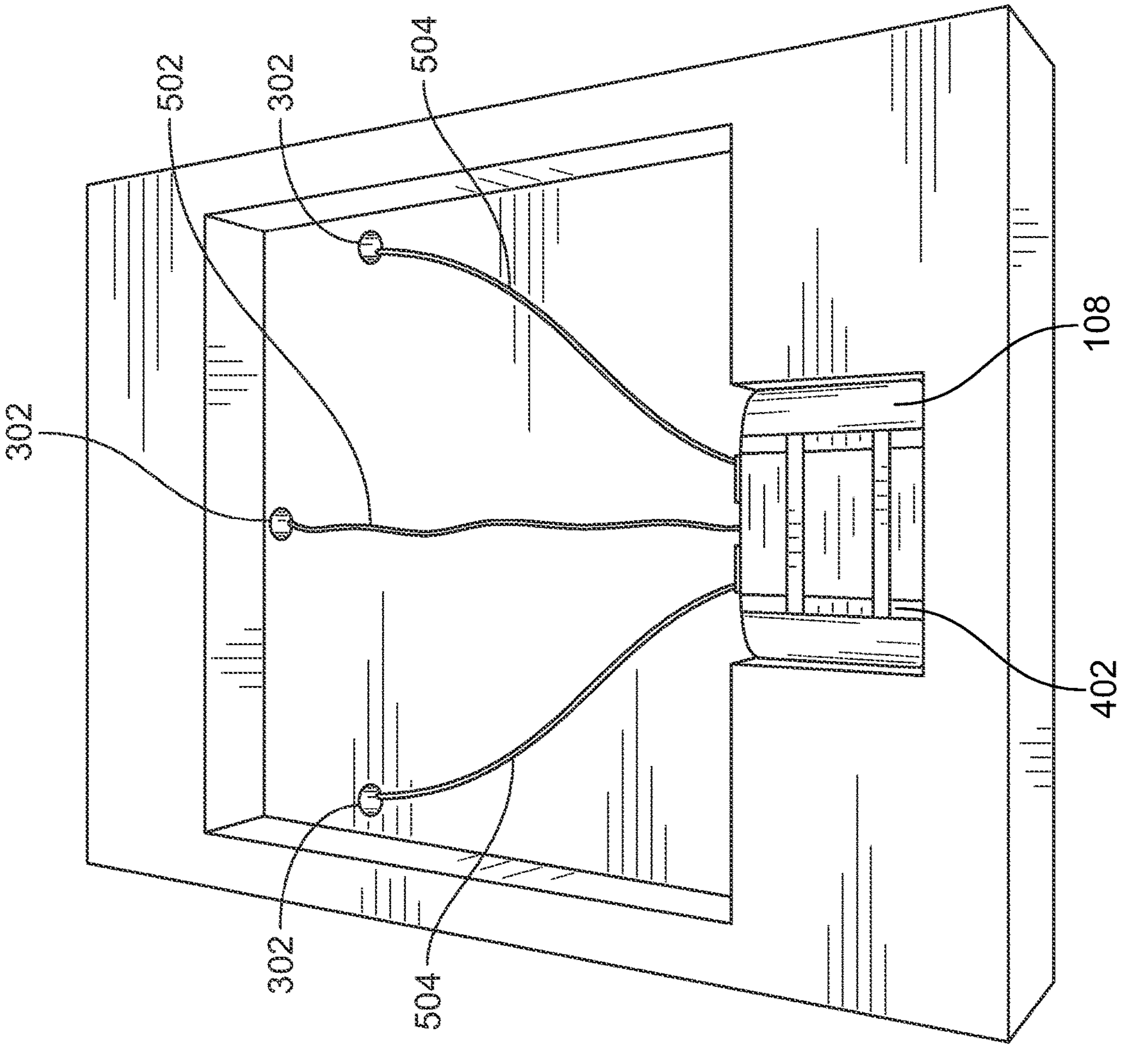
FIG. 5 illustrates a perspective view of an example tub compartment of the mattress system of FIG. 1 in which power cables are assembled within the tub compartment, according to an embodiment.
Figure 6:
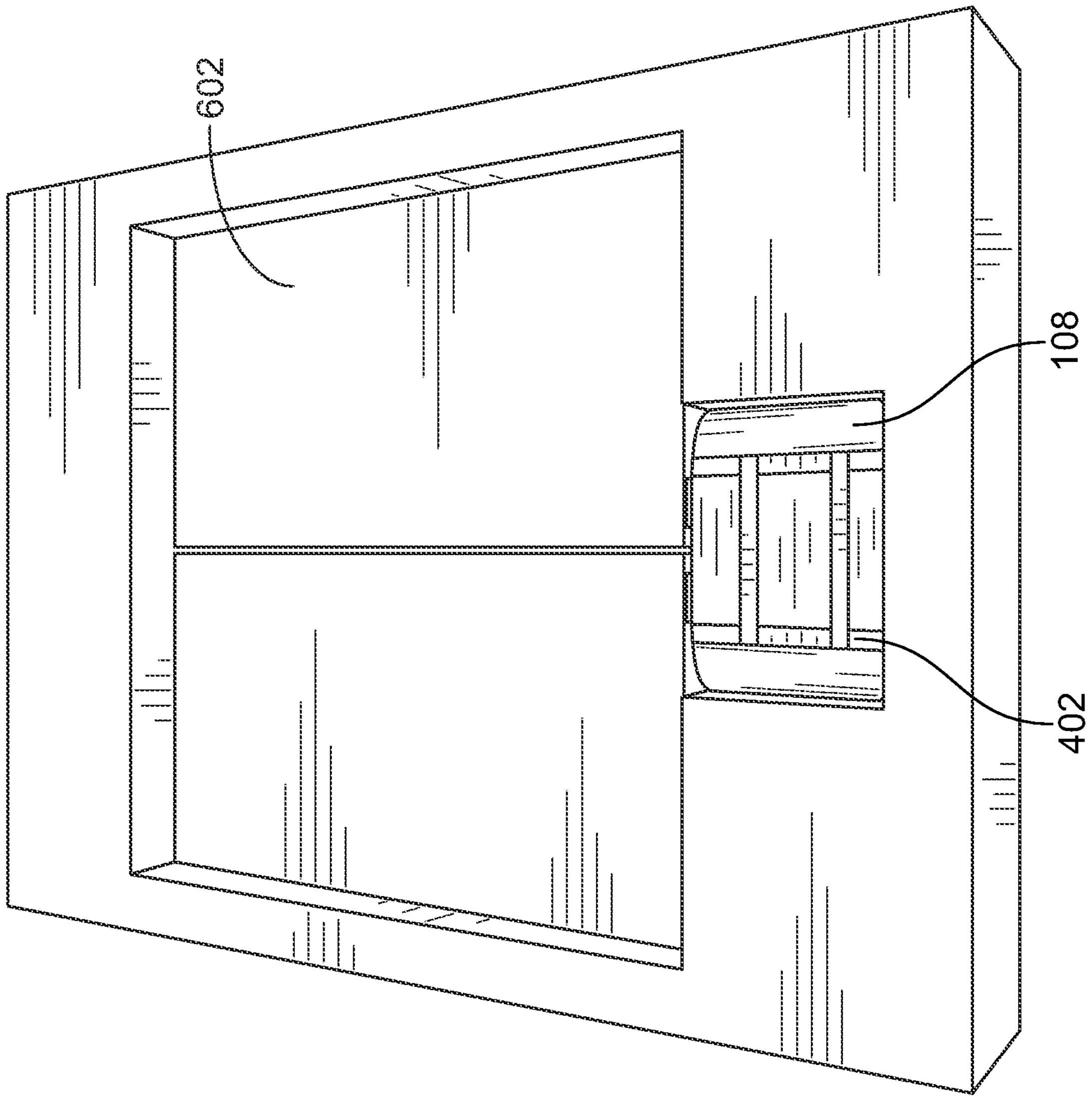
FIG. 6 illustrates a perspective view of an example tub compartment of the mattress system of FIG. 1 in which foam layers have been placed over the power cable assembly within the tub compartment, according to an embodiment.

Referring now to FIG. 5, in assembly, a power cable 502 of the control unit 108 may extend and thread through the hole 302. As shown, additional cables 504 (e.g., associated with the remote control 110) of the control unit 108 may extend and thread through the holes 302 closest thereto. In addition, after being threaded, an anti-static material may be wrapped around the electric plug of each of the cables 502 and 504. Doing so prevents any static electricity being generated during further assembly or transport of the mattress system 100, thereby preventing damage to the cables or the control unit 108. FIG. 6 illustrates a perspective view of the encasement 102 in which foam inserts 602 have been placed over the power cable assembly within the tub compartment, according to an embodiment. Doing so covers the cables 502 and 504 and allows the air bladders 106 and hoses connecting the assemblies 106 to the control unit 108 to be placed. The foam inserts 602 may be adhered to the upper surface of the tub compartment 104, e.g., using a glue or other adhesive.

Figure 7:
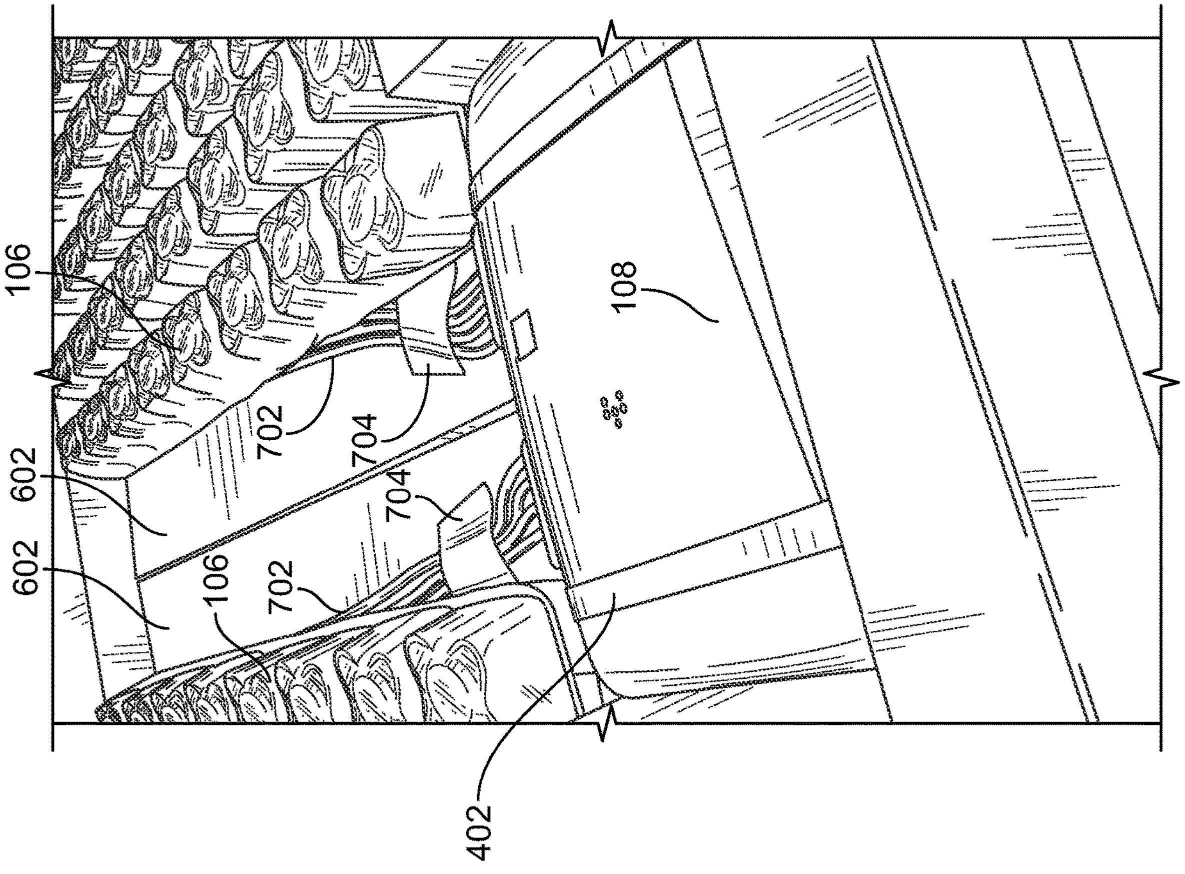
FIG. 7 illustrates an overhead view of an example tub compartment of the mattress system of FIG. 1 in which silicon tubes are assembled within the tub compartment, according to an embodiment.
Figure 8:
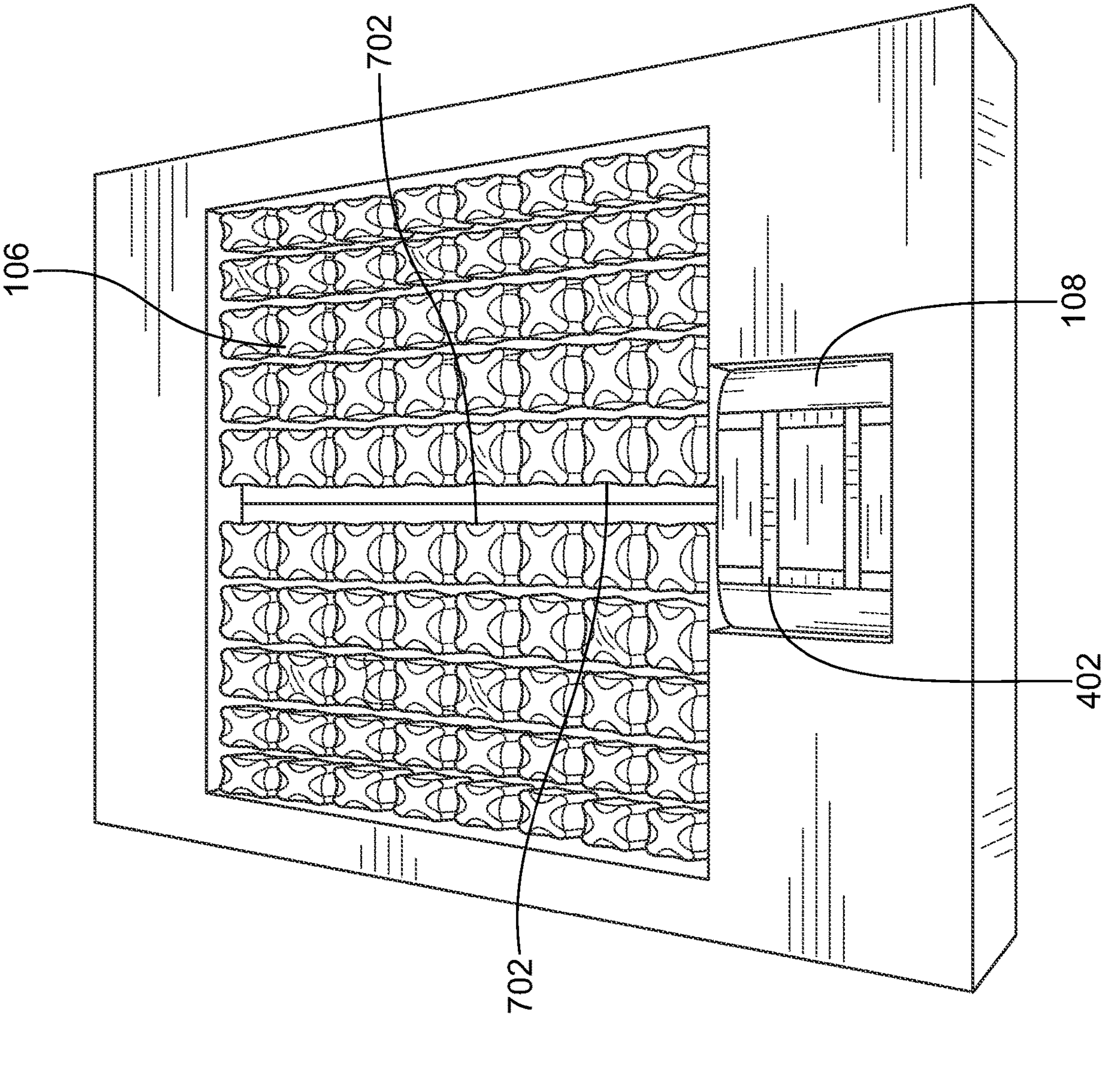
FIG. 8 illustrates a perspective view of an example tub compartment of the mattress system of FIG. 1 in which bladder assemblies have been placed over the silicon tube assembly within the tub compartment, according to an embodiment.
Figure 9:
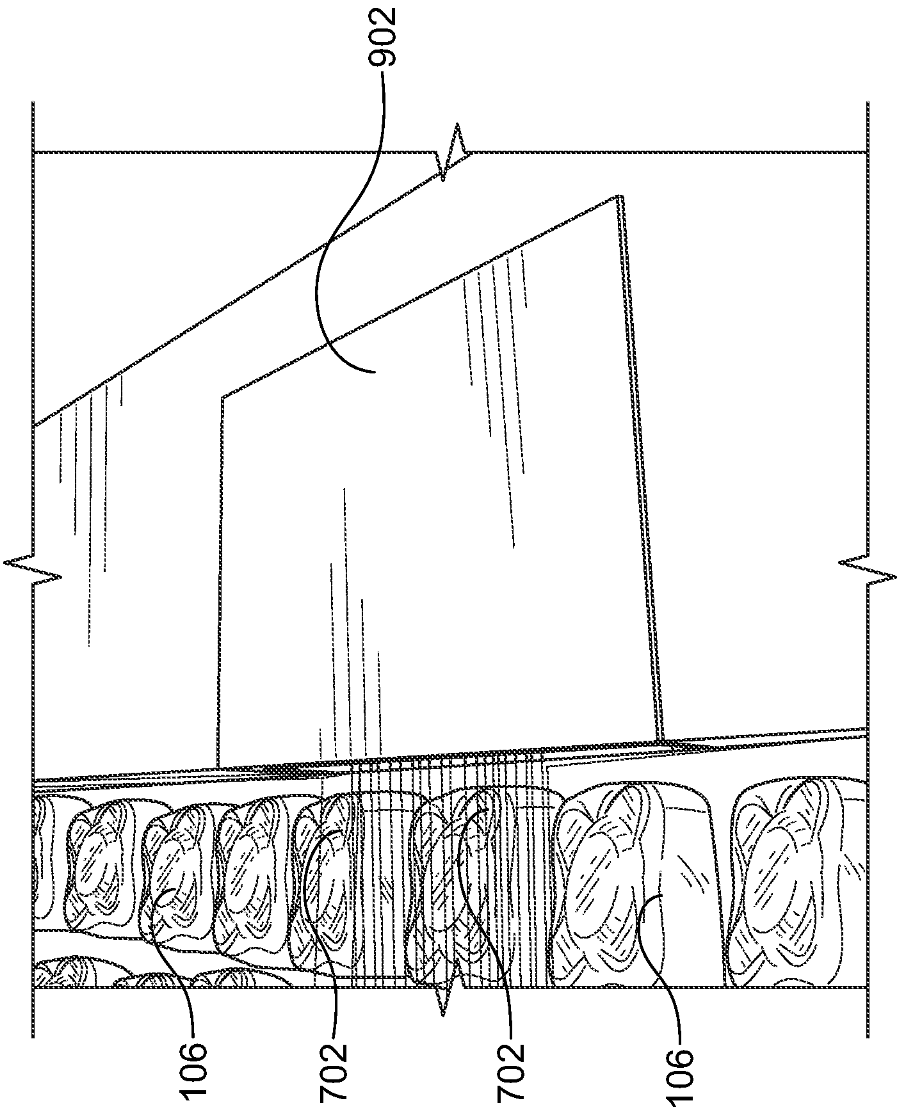
FIG. 9 illustrates a perspective view of a foam layer that may be fitted atop a control unit section of the tub compartment of the mattress system, according to an embodiment.

Once the control unit 108 is secured within the control unit section 303, the inflatable air bladders 106 may be installed within the tub compartment 104. For example, FIG. 7 illustrates a view of the tub compartment 104 in which silicon tubes 702 connect the control unit 108 and the air bladders 106. The silicon tubes 702 may provide an air channel to and from the air bladders 106. Further, each tube may correspond to a given color, in which a tube of a given color is to connect to a respective color label (e.g., R(ed), G(reen), B(lue), Y(ellow)) on the control unit 108. Of course, the tubes 702 may be identifiable through other methods, such as alphanumeric labels. In assembly, the silicon tubes 702 may be placed near the center of the tub compartment 104 and relatively under the air bladders 106. Further, to ensure that the silicon tubes 702 remain in position, e.g., during transport or regular use, the silicon tubes 702 may be secured using an adhesive material 704 (e.g., a tape, glue, etc.). FIG. 8 depicts yet another view of the encasement 102 having the bladders 106 and control unit 108 assembled inside the tub compartment 104. As shown in FIG. 9, a control unit topper 902 may be placed atop the control unit 108 to level out the upper surface of the encasement 102, along with base inserts being placed atop the air bladders 106.

Figure 10:
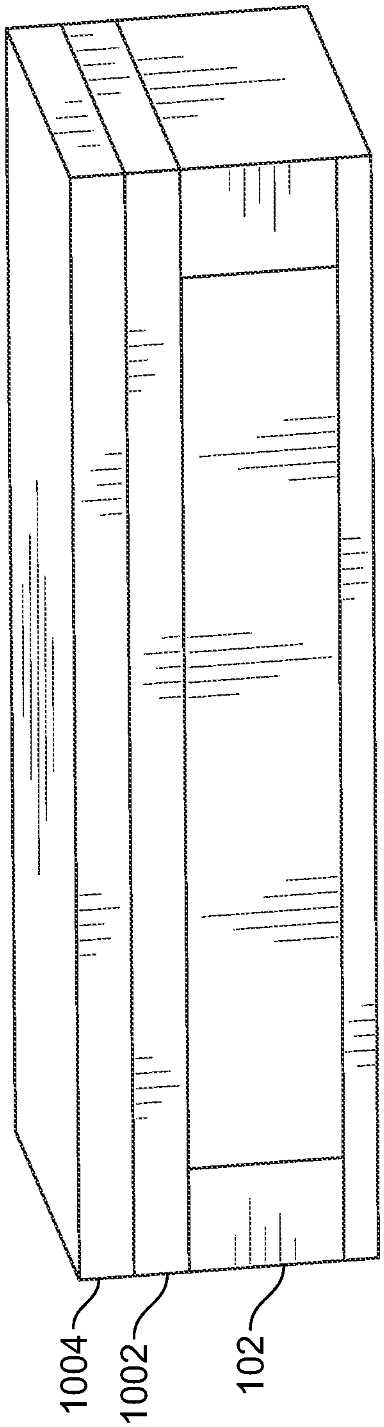
FIG. 10 illustrates a side view of the mattress system including foam layers placed atop the tub component, according to an embodiment.
Figure 11:
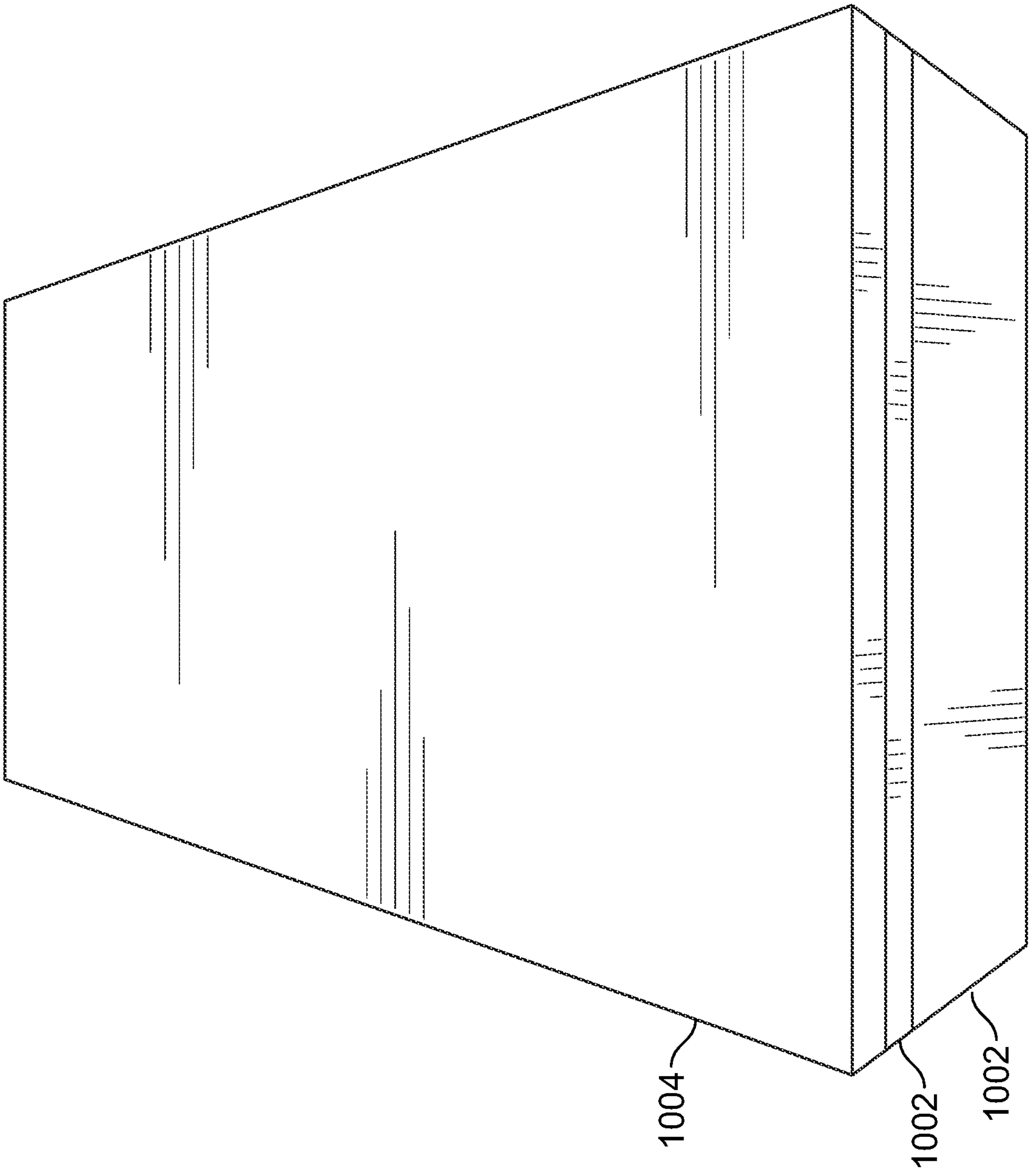
FIG. 11 illustrates a perspective view of the mattress system of FIG. 1 including foam layers placed atop the tub component, according to an embodiment.

Once the encasement 102 has been closed with foam inserts, one or more toppers may be layered atop the encasement 102. For example, FIG. 10 illustrates a side view of the mattress system 100 in which toppers 1002 and 1004 have been layered above the encasement 102, e.g., using an adhesive (e.g., a glue). Although FIG. 10 depicts two toppers of equal length (such as approximately 2 inches in height, each), one of skill in the art will recognize that any number of toppers of varying lengths may be used. Generally, using two foam toppers of 2 inches in height each may allow for a better user experience for the individual, such that, for example, when lying on the mattress, the individual is less likely to feel the individual cells of the bladders 106. FIG. 11 illustrates yet another view of the mattress system 100 including toppers 1002 and 1004, according to an embodiment.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration only, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media which may be read and executed by one or more processors. A machine-readable medium may include any suitable form of volatile or non-volatile memory.

In the drawings, specific arrangements or orderings of elements may be shown for ease of description. However, the specific ordering or arrangement of such elements is not meant to imply that a particular order or sequence of assembly, or separation of processes, is required in all embodiments. Further, some connections, relationships, or associations between elements may be simplified or not shown in the drawings so as not to obscure the disclosure.

This disclosure is considered to be exemplary and not restrictive. In character, and all changes and modifications that come within the spirit of the disclosure are desired to be protected. While particular aspects and embodiments are disclosed herein, other aspects and embodiments will be apparent to those skilled in the art in view of the foregoing teaching.

While the foregoing is directed to embodiments of the present disclosure, other and further embodiments of the disclosure may be devised without departing from the basic scope thereof, and the scope thereof is determined by the claims that follow.

What is claimed is:

1. A mattress system comprising:

an encasement having a tub compartment laterally extending from a head portion of the encasement and a foot portion of the encasement, the tub compartment having a relatively narrower section towards the foot portion of the encasement, the tub compartment having a plurality of holes formed in a bottom wall of the tub compartment and extending from a bottom of the tub compartment to an upper surface of the tub compartment;

a control unit coupled with the encasement, the control unit situated in a horizontal orientation within the section towards the foot portion of the encasement, the control unit including one or more cables extending therefrom, each cable being threaded through one of the plurality of holes;

an anti-static material wrapped around a portion of each of the one or more cables;

one or more straps each threaded through another of the plurality of holes and engaged over the control unit to further secure the control unit towards the foot portion of the encasement, wherein the one or more straps secures the control unit within the tub compartment by looping from under the tub compartment through the plurality of holes and over the control unit and wherein the one or more straps engaged over the control unit comprise at least one of a carabiner strap; and two or more toppers formed of a foam material positioned atop the encasement, the two or more toppers comprising a first topper and a second topper of an equal height, each of the first topper and second topper being approximately two inches in height, wherein the control unit further includes an adhesive applied to a base thereof, the adhesive adhering the control unit to a surface of the foot portion of the encasement.

2. The mattress system of claim 1, further comprising:

a first and a second air bladder situated within the tub compartment separate from the section towards the foot portion of the encasement, the first and second air bladders coupled to the control unit via one or more hoses extending from the control unit.

3. The mattress system of claim 2, wherein the hoses are secured to the tub compartment using a second adhesive material.

4. The mattress system of claim 1, further comprising one or more inserts to level a surface of the encasement.

5. The mattress system of claim 1, wherein the encasement is formed of a foam material.

6. A mattress system comprising:

an encasement having a tub compartment laterally extending from a head portion of the encasement and a foot portion of the encasement, the tub compartment having a relatively narrower section towards the foot portion of the encasement, the tub compartment having a plurality of holes formed in a bottom wall of the tub compartment and extending from a bottom of the tub compartment to an upper surface of the tub compartment;

a first and a second air bladder situated within the tub compartment separate from the section towards the foot portion of the encasement;

a control unit coupled with the encasement, the control unit situated in a horizontal orientation within the section towards the foot portion of the encasement, the control unit including one or more cables extending therefrom, each cable being threaded through one of the plurality of holes;

an anti-static material wrapped around a portion of each of the one or more cables;

one or more straps each threaded through another of the plurality of holes and engaged over the control unit to further secure the control unit towards the foot portion of the encasement, wherein the one or more straps secures the control unit within the tub compartment by looping from under the tub compartment through the plurality of holes and over the control unit and wherein the one or more straps engaged over the control unit comprise at least one of a carabiner strap; and two or more toppers formed of a foam material positioned atop the encasement, the two or more toppers comprising a first topper and a second topper of an equal height, each of the first topper and second topper being approximately two inches in height, wherein the control unit further includes an adhesive applied to a base thereof, the adhesive adhering the control unit to a surface of the foot portion of the encasement.

7. The mattress system of claim 6, wherein the first and second air bladders are coupled to the control unit via one or more hoses extending from the control unit.

8. The mattress system of claim 7, wherein the hoses are secured to the tub compartment using an adhesive material.

9. The mattress system of claim 6, wherein the encasement is formed of a foam material, and further comprising one or more inserts to level a surface of the encasement.

* * * * *